(12) United States Patent
Himatsingani et al.

(10) Patent No.: US 11,161,272 B2
(45) Date of Patent: Nov. 2, 2021

(54) METHOD OF MANUFACTURING OSB WITH ACOUSTIC DAMPENING PROPERTIES

(71) Applicant: LOUISIANA-PACIFIC CORPORATION, Nashville, TN (US)

(72) Inventors: Ashwin Himatsingani, Brentwood, TN (US); Jianwen Ni, Franklin, TN (US)

(73) Assignee: LOUISIANA-PACIFIC CORPORATION, Nashville, TN (US)

( * ) Notice: Subject to any disclaimer, the term of this patent is extended or adjusted under 35 U.S.C. 154(b) by 235 days.

(21) Appl. No.: 15/832,327

(22) Filed: Dec. 5, 2017

(65) Prior Publication Data

US 2018/0345531 A1 Dec. 6, 2018

Related U.S. Application Data

(60) Provisional application No. 62/429,896, filed on Dec. 5, 2016.

(51) Int. Cl.

| | |
|---|---|
| *B27N 3/04* | (2006.01) |
| *C08L 97/02* | (2006.01) |
| *B32B 21/14* | (2006.01) |
| *E04B 1/86* | (2006.01) |
| *B27N 1/00* | (2006.01) |
| *B27N 7/00* | (2006.01) |
| *B32B 5/26* | (2006.01) |
| *G10K 11/168* | (2006.01) |

(52) U.S. Cl.
CPC ............... *B27N 3/04* (2013.01); *B27N 1/00* (2013.01); *B27N 7/00* (2013.01); *B32B 5/26* (2013.01); *B32B 21/14* (2013.01); *C08L 97/02* (2013.01); *E04B 1/86* (2013.01); *G10K 11/168* (2013.01); *B32B 2255/08* (2013.01); *B32B 2255/24* (2013.01); *B32B 2262/067* (2013.01); *B32B 2307/102* (2013.01); *B32B 2607/00* (2013.01)

(58) Field of Classification Search
None
See application file for complete search history.

(56) References Cited

U.S. PATENT DOCUMENTS

| | | |
|---|---|---|
| 3,652,360 A | 3/1972 | Hartman et al. |
| 4,968,549 A | 6/1990 | Smimizu et al. |
| 2005/0019548 A1 | 1/2005 | Liu et al. |
| 2008/0264721 A1 | 10/2008 | Tinianov et al. |
| 2009/0001627 A1* | 1/2009 | Lu .................. D21H 21/18 264/128 |
| 2015/0017461 A1* | 1/2015 | Lindgren ............ B27N 3/02 428/528 |

* cited by examiner

*Primary Examiner* — Chinessa T. Golden
(74) *Attorney, Agent, or Firm* — Wayne Edward Ramage; Baker Donelson

(57) ABSTRACT

A manufacturing process for manufacturing wood products with acoustic dampening properties. A noise-dampening polymer is introduced in-line in the manufacturing process to achieve higher acoustic performance. The polymer can be a viscoelastic polymer which is added during blending of the lignocellulosic strands prior to mat formation, or sprayed or otherwise coated on the lignocellulosic strands during mat formation, prior to formation of any boards or panels.

23 Claims, 3 Drawing Sheets

METHOD OF MANUFACTURING OSB WITH ACOUSTIC DAMPENING PROPERTIES

This application claims benefit of and priority to U.S. Provisional Application No. 62/429,896, filed Dec. 5, 2016, and is entitled to that filing date for priority. The specification, figures, and complete disclosure of U.S. Provisional Application No. 62/429,896 are incorporated herein in their entireties by specific reference for all purposes.

FIELD OF INVENTION

This invention relates to a method and system for manufacturing wood products (such as OSB, oriented strand board) with acoustic dampening properties.

BACKGROUND OF THE INVENTION

Acoustic comfort is important in building design. Noise is the often the primary complaint by home owners in residential single-family homes, and noise reduction also is an important performance criterion in multi-family and commercial construction (particularly in the healthcare and education segments). Airborne noise/STC (Sound Transmission Class) rating and impact noise (Impact Insulation Class, IIC) rating in wall and floor or ceiling assemblies often is specified in codes and standards by ANSI, IgCC and LEED.

Airborne noise from outside or inside the living space has been addressed with various field-applied and pre-fabricated noise dampening constructions products, such as resilient channels, clips, staggered studs, multiple layers of drywall, wall cavity insulation, and laminated acoustic drywall. Acoustic materials have been used to laminate two panels of various building materials through a secondary process to improve acoustic performance. However, there are no building materials, such as OSB-based siding, sheathing, roofing or flooring, that incorporate a sound dampening material in the primary manufacturing process of panels with improved acoustic performance.

SUMMARY OF THE INVENTION

In various exemplary embodiments, the present invention comprises a method or process for manufacturing wood products with acoustic dampening properties. The manufactured wood product include, but are not limited to, oriented strand board (OSB), LSL, MDF, particleboard, or various wood composites. The system introduces a noise-dampening polymer in-line in the manufacturing process to achieve higher acoustic performance (e.g., STC and IIC rating) in siding, sheathing, roofing, flooring, and similar applications using the manufactured wood product. The polymer can be a viscoelastic polymer which is added during blending or formation of the wood product. In one exemplary embodiment, as described in greater detail below, viscoelastic polymer is added to the center strand layer during the OSB manufacturing process.

General elements of the OSB manufacturing process include the drying and storing of wood strands, the treatment or blending of designated strands (e.g., bottom, core, top) with applicable chemicals or additives (e.g., wax, resin binders, and the like) the forming of the appropriate layers in order (first bottom surface, then core, then top surface) using designated strands, the application of heat and pressure to the mats to form boards, and subsequent processing (e.g., panels cut to size, edges sealed, and packaging) to produce the finished product.

In a first embodiment of the manufacturing process, the core strands are coated with the noise-dampening polymer in a strand blender or blender. The polymer can be blended with the core strands separately, or along with other additives typically added during the OSB process, such as waxes or resin binders. These treated core strands are used to form the central layer, sandwiched between the bottom surface and top surface. The finished product is an OSB panel with a central layer with core strands blended with the noise-dampening acoustic material or materials. This coating by blending can also take place for strands in other layers.

In another exemplary embodiment, the noise-dampening acoustic material or materials are applied through a spraying, flow, curtain, or other coating process in the forming line before, during or after the center strand layer is laid on the forming line. This coating can also take place for strands in other layers.

The finished product is an OSB or manufactured wood panel with a central layer with core strands (and possibly other layers) integrally coated, permeated or infused with the noise-dampening acoustic material or materials.

DETAILED DESCRIPTION OF EXEMPLARY EMBODIMENTS

In various exemplary embodiments, the present invention comprises a method or process for manufacturing wood products with acoustic dampening properties. The manufactured wood product include, but are not limited to, oriented strand board (OSB), LSL, MDF, particleboard, or various wood composites.

In several embodiments, the present invention comprises a system for introducing a noise-dampening polymer in-line in the manufacturing process to achieve higher acoustic performance (e.g., STC and/or IIC rating) in siding, sheathing, roofing, flooring, and similar applications using the manufactured wood product. The polymer can be a viscoelastic polymer which is added during blending or formation of the wood product. In one exemplary embodiment, as described in greater detail below, viscoelastic polymer is added to the center strand layer during the OSB manufacturing process.

Figure 1:
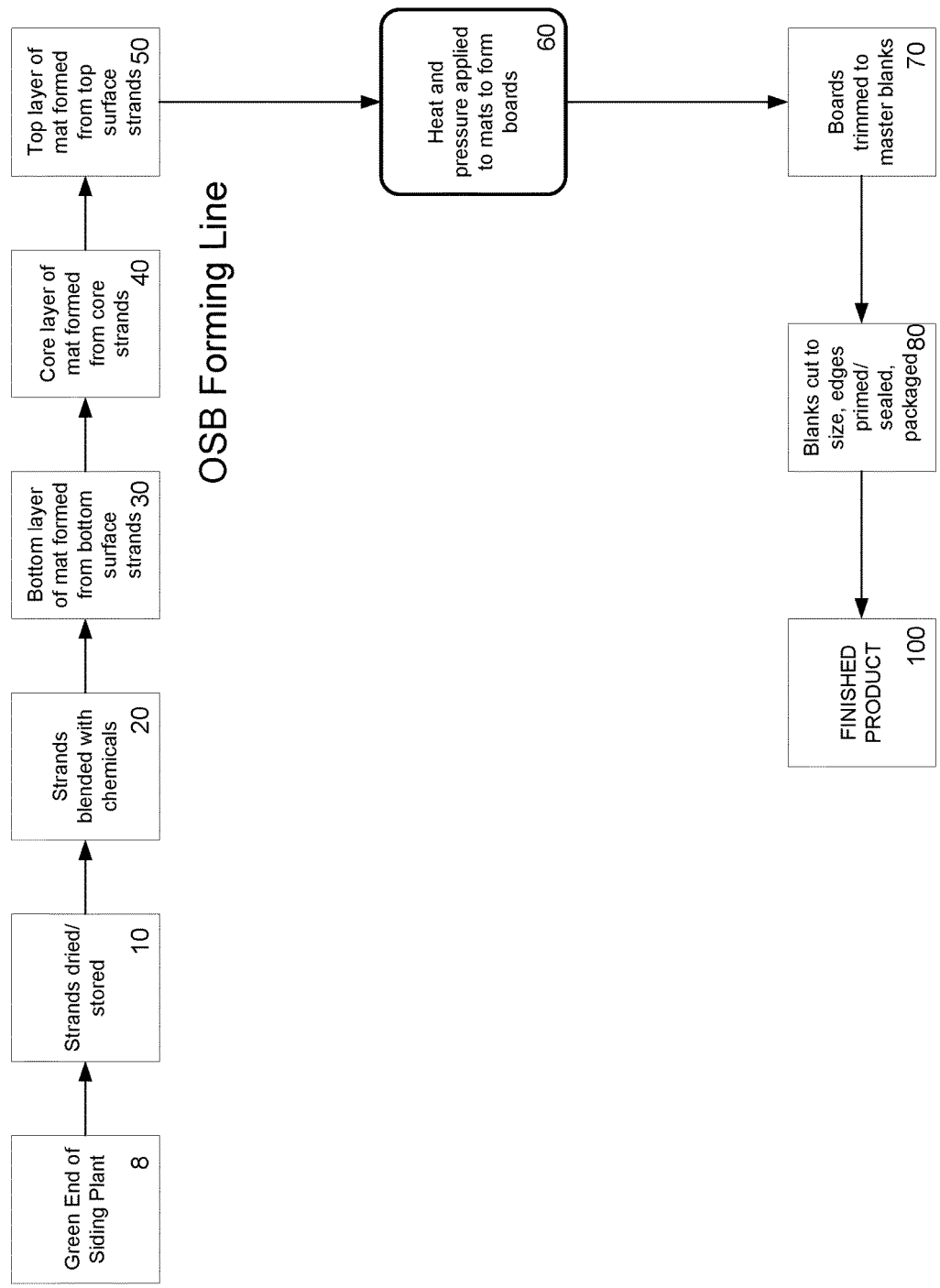
FIG. 1 shows a view of a system in accordance with an embodiment of the present invention.
Figure 2:
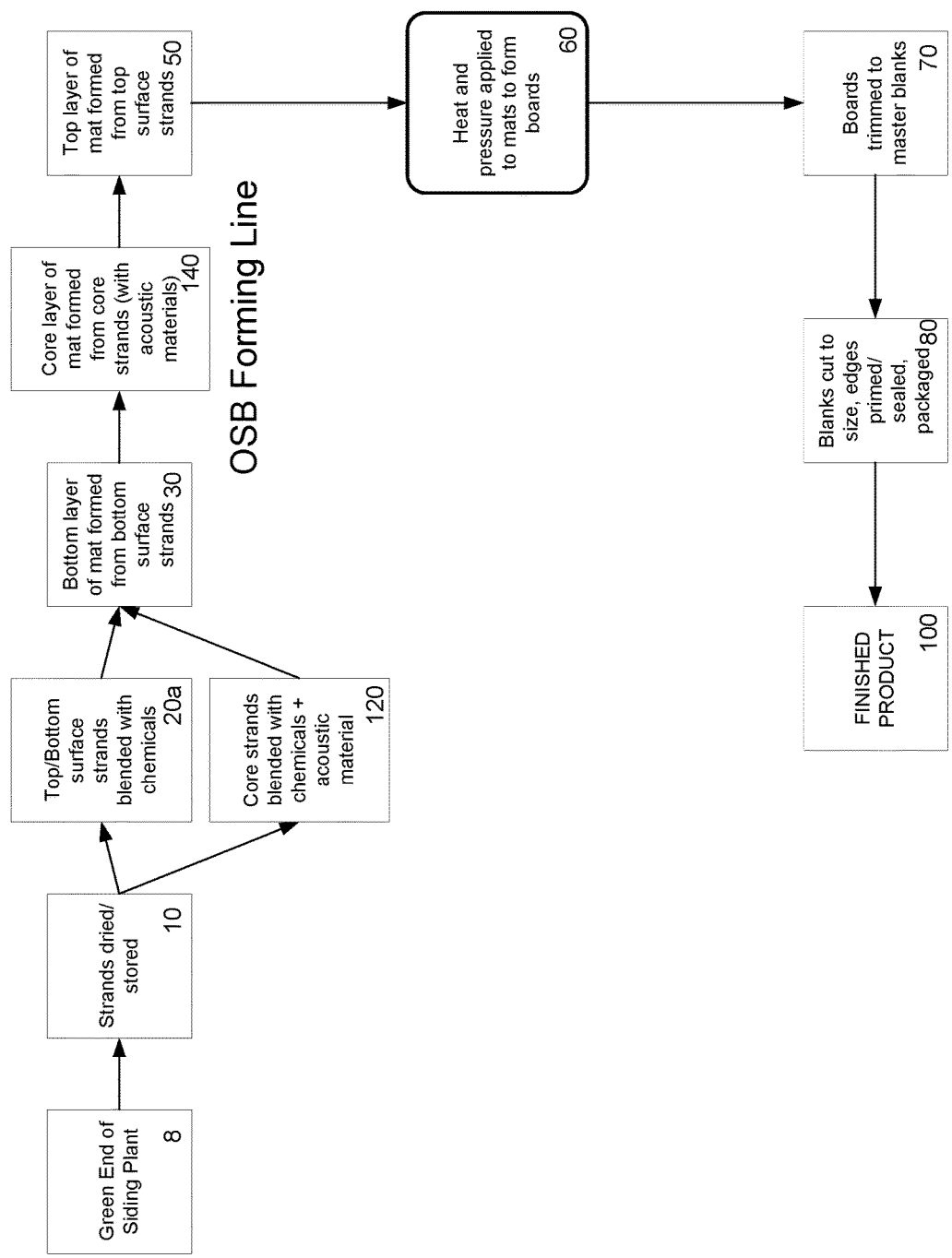
FIG. 2 shows another system in accordance with another embodiment of the present invention.

General elements of the OSB manufacturing process in accordance with the present invention, as seen in FIGS. 1 and 2, include the drying and storing of wood strands 10, the treatment or blending of designated strands (e.g., bottom, core, top) with applicable chemicals and/or additives (e.g., wax, resin, and the like) 30, the forming of the appropriate layers in order (first bottom surface, then core, then top surface) using designated strands, 30, 40, 50, the application of heat and pressure to the mats using a primary press to form boards 60, and subsequent trimming 70 and processing (e.g., panels cut to size, edges primed/sealed, and packaging) 80 to produce the finished product 100. Strands for a particular layer typically are blended with applicable chemicals and/or additives in a bin, separate from strands for other layers, although this is not always the case. Examples of primary processes are described in U.S. Pat. Nos. 6,461,743; 5,718,786; 5,525,394; 5,470,631; and 5,425,976; all of which are incorporated herein in their entireties by specific reference for all purposes.

FIG. 2 shows an embodiment of the manufacturing process where the core strands are coated with the noise-dampening polymer in a strand blender or blenders 120. The top and bottom surface strands are blended separately 20a, although in some embodiments, one or both sets of strands also may be blended with a noise-dampening polymer. The polymer can be blended with the core strands separately, or along with other additives typically added during the OSB process, such as waxes or resin binders. The treated core strands are used to form the central core layer 140, sandwiched between the bottom surface and top surface. The finished product is an OSB panel (or other manufactured wood product) with a core layer with core strands blended with the noise-dampening acoustic material or materials. The heat and pressure applied during the primary pressing process prmotes the noise-dampening acoustic material to integrally coat, permeate or infuse the core layer, and in several embodiments, portions of the bottom and/or top surface layers.

Figure 3:
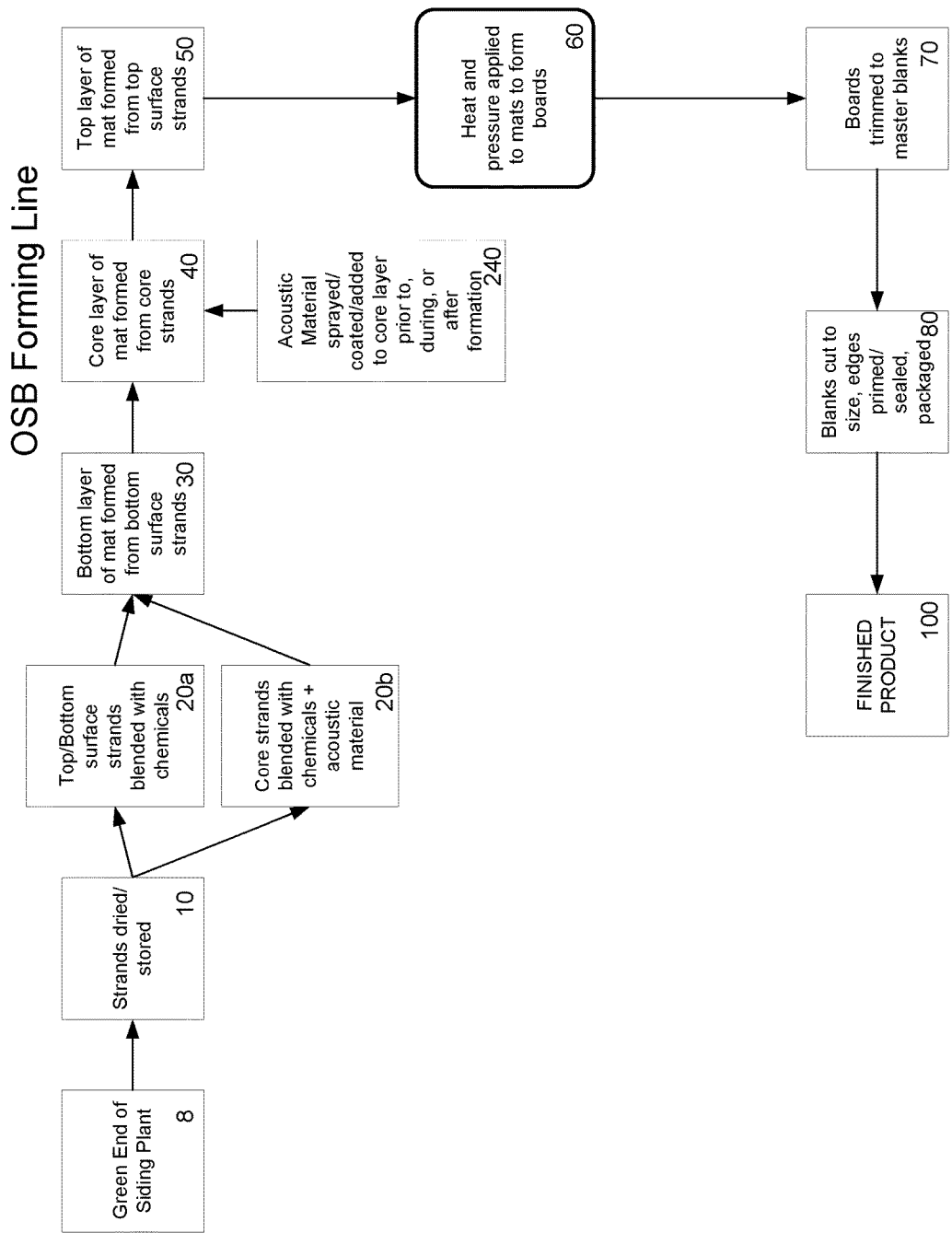
FIG. 3 shows another system in accordance with another embodiment of the present invention.

FIG. 3 shows another second embodiment of the manufacturing process where, after blending of the strands 20a, b, the noise-dampening acoustic material or materials are applied through a spraying, flow, curtain or other coating process 240 in the forming line before, during, or after the center core strand layer is laid on the forming line. The finished product is an OSB panel (or other manufactured wood product) with a central layer with core strands coated with the noise-dampening acoustic material or materials. As described above, the heat and pressure applied during the primary pressing process promotes the noise-dampening acoustic material to integrally coat, permeate or infuse the core layer, and in several embodiments, portions of the bottom and/or top surface layers.

The components and parameters of the above processes can vary. In one exemplary embodiment, the wood strands can be derived from hard (e.g., aspen) or soft (e.g., southern yellow pine) woods, and can be homogenous (i.e., single wood type) or mixed, and green (moisture content from about 30% to about 200%) or dried (e.g., moisture content up to about 12%) (where moisture content %=(weight of water in wood/oven-dry weight of wood)×100). Binders include, but are not limited to, isocyanate resin, urea-formaldehyde, phenol formaldehyde, melamine formaldehyde, bio-adhesives, or combinations thereof. In one embodiment, polymeric isocyanate resin (pMDI, or polymeric diphenylmethane diisocyanate) is used at about 1.2 to about 20 weight %. Waxes include, but are not limited to, a molten wax or emulsion was (in one embodiment, up to about 2.5 weight %). Other chemicals or additives may be used, including, for example, fire retardants, weather-resistant chemicals, or the like. Viscoelastic polymer is added as described above to the center layer or any other layer in the mat. Press time is from 1 to 20 minutes at a temperature from about 100° C. to about 240° C. The resulting panel can range in thickness from about ¼" to about 7", and in density from about 25 pcf to about 60 pcf (pounds per cubic foot).

In any of the above embodiments, the thickness and/or density of the top or bottom strand layer, or both, can be modified as well to achieve an improved acoustic performance/STC rating. The present invention thus provides an OSB or manufactured wood panel with a noise-dampening polymer introduced in-line, with a resulting increase (1) in acoustic performance as compared to a standard OSB panel, and (2) in efficiency and reduction in cost compared to secondary manufacturing processes. The noise-dampening polymer becomes integrated with, and infuses or permeates the layer or layers of the panel.

In several embodiments, the noise-dampening of the present invention applies to both airborne sound transmission loss and impact sound insulation. In some embodiments, panels produced in accordance with the present invention smooth airborne sound transmission loss curves in the ASTM E90 test method, particularly increasing loss (dB) in frequency ranges where sound is transmitted more effectively due to physical characteristics (i.e., of a similar panel but without the sound-dampening agent). In one embodiment, the present invention increases airborne transmission loss in the sound frequency ranges of from about 1.5 K to about 4 K Hz (more particularly, from about 2 K to about 3.2 K Hz, or even more particularly, from about 2.5 K to about 3.15 K Hz).

In additional embodiments, panels produced in accordance with the present invention demonstrate increased impact sound insulation and decreased sound pressure levels. In one embodiment, such panels have a tested apparent impact insulation class (AIIC) rating in the range from about 26 to about 34, as determined by ASTM Standard E-1007 (2016). In contrast, a control panel without noise-dampening polymer had an AIIC rating of 19.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A manufactured wood product, comprising:
a panel with a bottom layer, a core layer, and a top layer, with noise-dampening properties formed during a panel manufacturing process with a press configured to apply heat and pressure to a multilayer mat of lignocellulosic material, wherein:
the bottom layer comprises a set of bottom layer lignocellulosic material;
the core layer comprises a set of core layer lignocellulosic material with a noise-reducing polymer mixed with or sprayed upon the core lignocellulosic material prior to insertion of the multilayer mat into the press; and
the top layer comprises a set of top layer lignocellulosic material;
wherein said core layer lignocellulosic material is integrally coated or permeated with the noise-reducing polymer; and
wherein the noise-reducing polymer does not form a homogenous layer.

2. The manufactured wood product of claim 1, wherein the panel increases airborne sound transmission loss, increases impact sound insulation, and decreases sound pressure levels.

3. The manufactured wood product of claim 2, wherein the panel increases airborne transmission loss in sound frequency ranges from about 2 K to about 3.2 K Hz.

4. A manufactured wood product, comprising:
a manufactured wood panel with multiple lignocellulosic material-based layers, wherein one or more of said multiple lignocellulosic material-based layers comprise a noise-reducing polymer integrally coating or permeating the lignocellulosic material forming said one or more layers through application of heat and pressure during formation of the manufactured wood panel;
wherein the noise-reducing polymer does not form a homogenous layer.

5. The manufactured wood product of claim 4, wherein the multiple layers comprise a bottom layer, a core layer, and a top layer.

6. The manufactured wood product of claim 5, wherein the noise-reducing polymer is integrated with the material forming the core layer.

7. The manufactured wood product of claim 5, wherein the bottom layer, core layer, and top layer each comprises lignocellulosic material.

8. The manufactured wood product of claim 4, wherein said one or more layers comprise lignocellulosic strands.

9. The manufactured wood product of claim 8, wherein said noise-reducing polymer is integrated with the lignocellulosic strands by blending the noise-reducing polymer with the lignocellulosic strands prior to formation of said one or more layers.

10. The manufactured wood product of claim 4, wherein said noise-reducing polymer is integrated with said one or more layers by spraying the noise-reducing polymer on said one or more layers during formation of a multilayer mat.

11. The manufactured wood product of claim 4, wherein said panel is an OSB panel.

12. The manufactured wood product of claim 4, wherein the noise-reducing polymer is a viscoelastic polymer.

13. The manufactured wood product of claim 4, wherein the panel increases airborne sound transmission loss, increases impact sound insulation, and decreases sound pressure levels.

14. The manufactured wood product of claim 13, wherein the panel increases airborne transmission loss in sound frequency ranges from about 2 K to about 3.2 K Hz.

15. The manufactured wood product of claim 13, wherein the manufactured wood panel has an apparent impact insulation class rating in a range from about 26 to about 34, as determined by ASTM Standard E-1007.

16. A manufactured wood product, comprising:
a panel with a bottom layer, a core layer, and a top layer, with noise-dampening properties formed during a panel manufacturing process with a press configured to apply heat and pressure to a multilayer mat of lignocellulosic material, wherein:
the bottom layer comprises a set of bottom layer lignocellulosic material with one or more chemicals or additives added prior to insertion of the multilayer mat into the press;
the core layer comprises a set of core layer lignocellulosic material with one or more chemicals or additives added prior to insertion of the multilayer mat into the press, and with a noise-reducing polymer mixed with or sprayed upon the core lignocellulosic material prior to insertion of the multilayer mat into the press; and
the top layer comprises a set of top layer lignocellulosic material with one or more chemicals or additives added prior to insertion of the multilayer mat into the press;
wherein said core layer lignocellulosic material is integrally coated or permeated with the noise-reducing polymer;
wherein the panel increases airborne sound transmission loss, increases impact sound insulation, and decreases sound pressure levels; and
wherein the panel has an apparent impact insulation class rating in a range from about 26 to about 34, as determined by ASTM Standard E-1007.

17. A method for producing a noise-dampening manufactured wood product, comprising the steps of:
treating a set of bottom layer lignocellulosic strands with one or more chemicals or additives;
treating a set of core layer lignocellulosic strands with one or more chemicals or additives;
treating a set of top layer lignocellulosic strands with one or more chemicals or additives;
adding, in a manufacturing production line, a noise-reducing polymer with the lignocellulosic strands in one or more of said layer sets;
forming a multilayer mat with said treated layer sets; and
applying heat and pressure to the multilayer mat to form one or more panels according to claim 4.

18. The method of claim 17, further comprising the step of post-press processing of the one or more boards to produce one or more panels.

19. The method of claim 18, wherein the one or more panels are OSB panels.

20. The method of claim 17, wherein the noise-reducing polymer is a viscoelastic polymer.

21. The method of claim 17, wherein the noise-reducing polymer is added to the set of core layer lignocellulosic strands.

22. The method of claim 17, wherein the step of adding the noise-reducing polymer comprises blending the noise-reducing polymer with the lignocellulosic strands prior to formation of the multilayer mat.

23. The method of claim 17, wherein the step of adding the noise-reducing polymer comprises spraying, flowing, curtain or otherwise coating one or more layers of the multilayer mat with the noise-reducing polymer during formation of the multilayer mat.

\* \* \* \* \*